Oct. 29, 1940.　　　D. B. MEARS　　　2,219,999
DIAGNOSTIC APPARATUS
Filed June 10, 1938　　　5 Sheets-Sheet 1
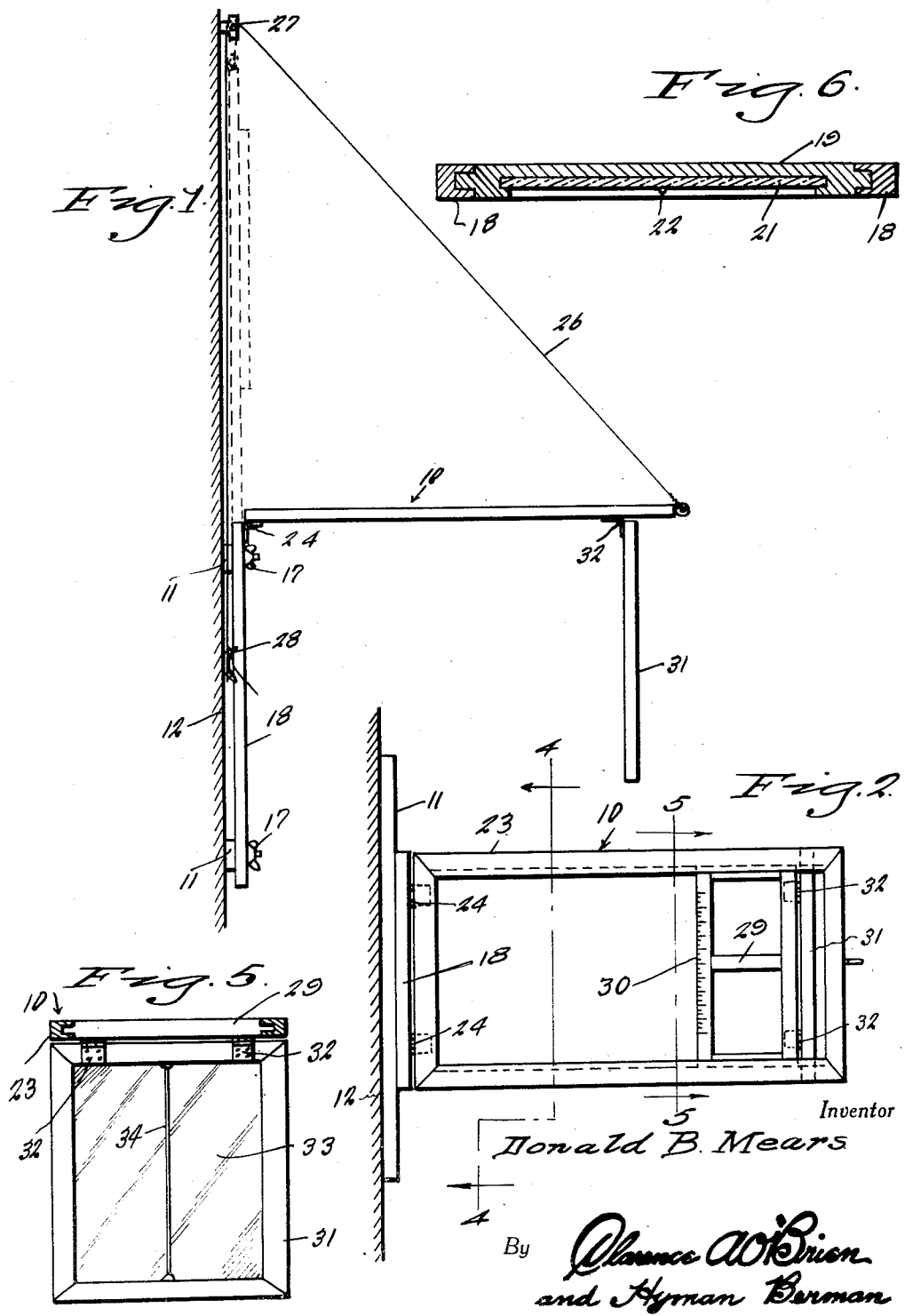

Oct. 29, 1940.  D. B. MEARS  2,219,999
DIAGNOSTIC APPARATUS
Filed June 10, 1939  5 Sheets-Sheet 2
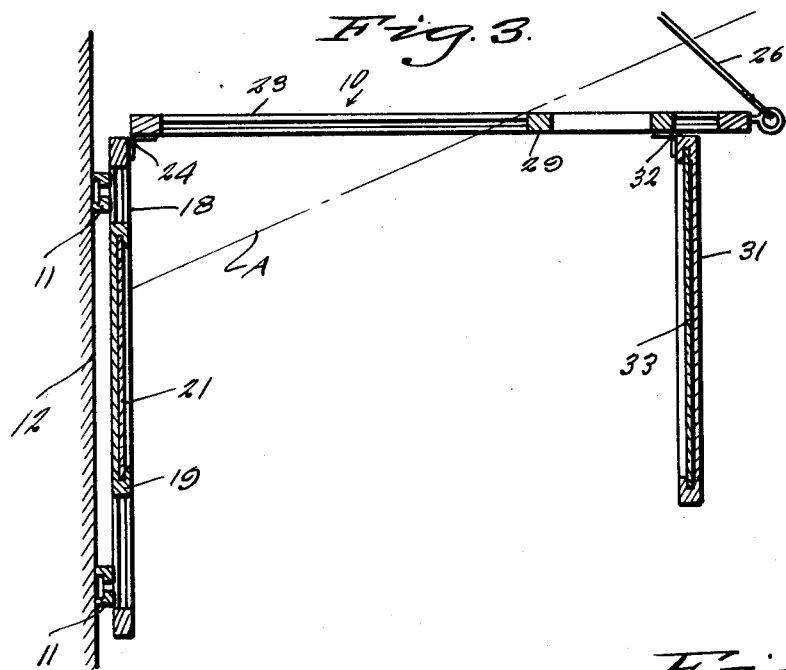
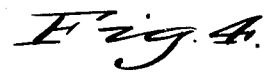
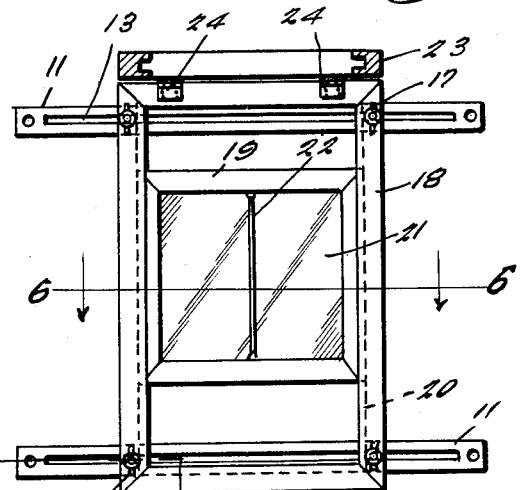
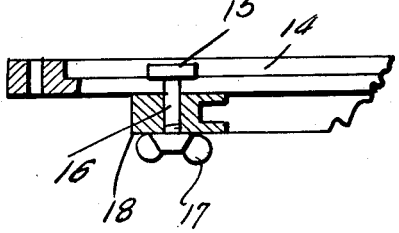
Inventor
Donald B. Mears
By Clarence A. O'Brien
and Hyman Berman
Attorneys Oct. 29, 1940.　　　D. B. MEARS　　　2,219,999
DIAGNOSTIC APPARATUS
Filed June 10, 1938　　　5 Sheets-Sheet 3
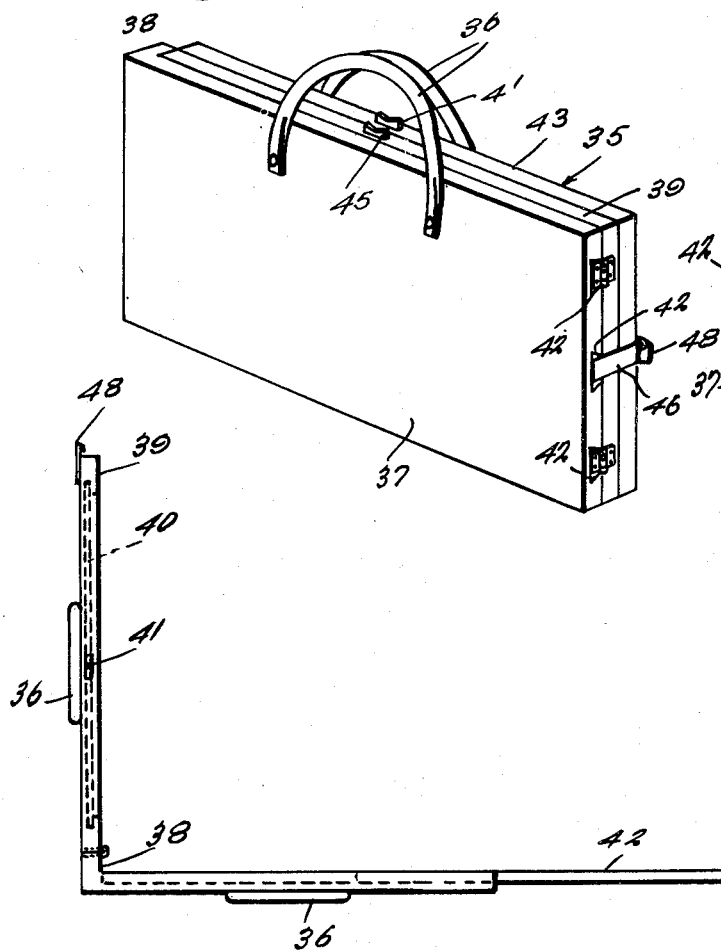
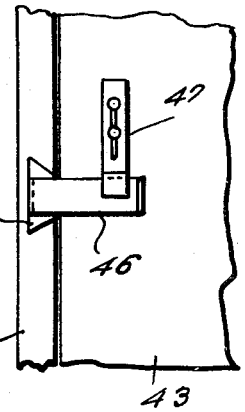
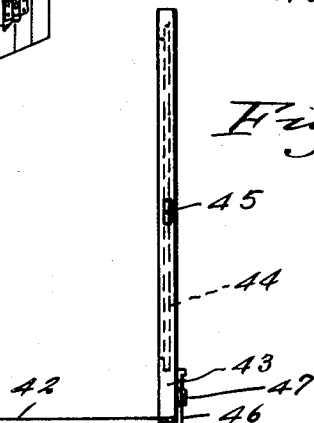
Inventor
Donald B. Mears
By Clarence A. O'Brien
and Hyman Berman
Attorneys Oct. 29, 1940.  D. B. MEARS  2,219,999
DIAGNOSTIC APPARATUS
Filed June 10, 1939   5 Sheets-Sheet 4
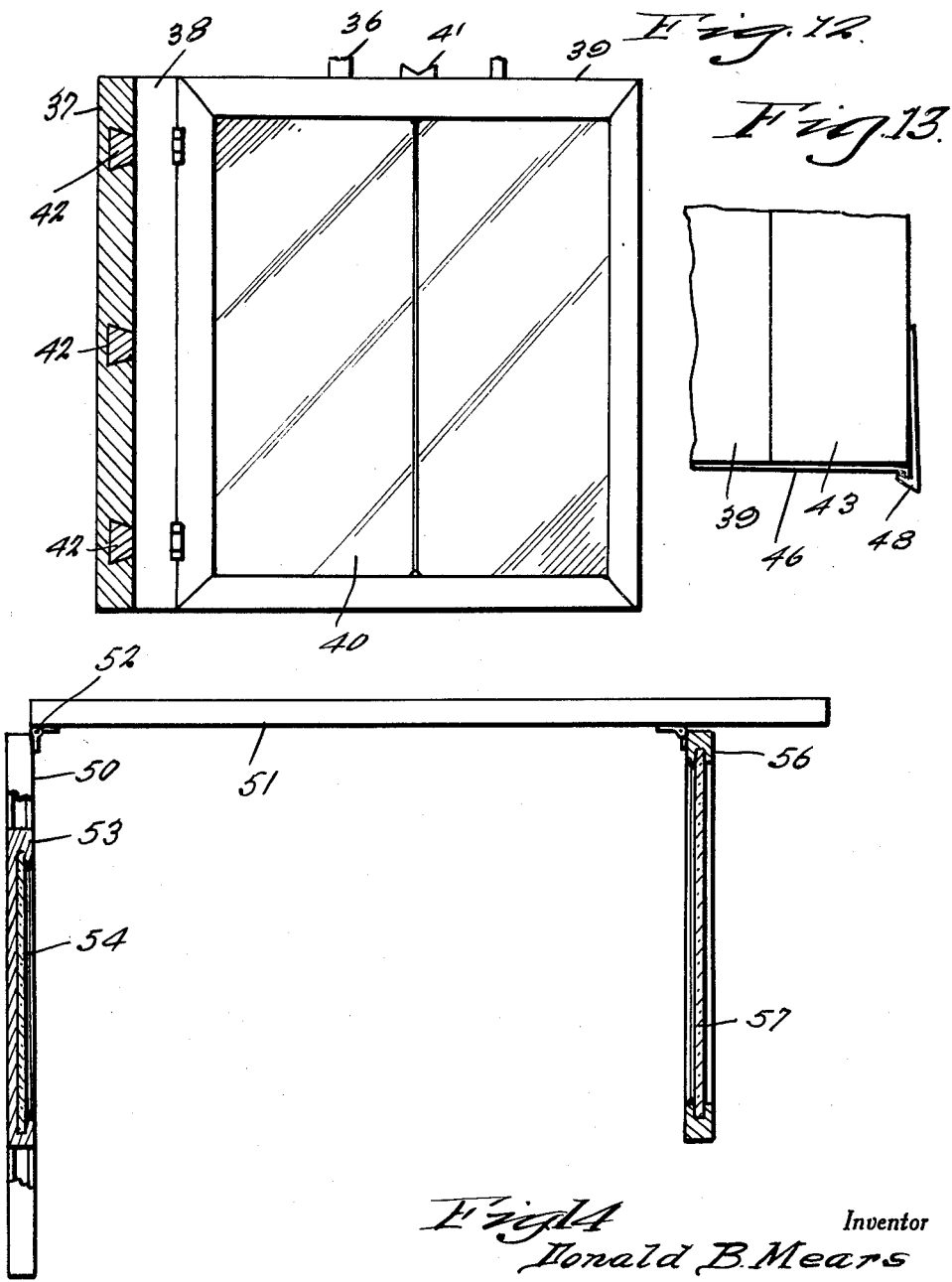

Inventor
Donald B. Mears

Patented Oct. 29, 1940

2,219,999

UNITED STATES PATENT OFFICE 2,219,999

DIAGNOSTIC APPARATUS

Donald B. Mears, St. Albans, Vt.

Application June 10, 1938, Serial No. 213,094

3 Claims. (Cl. 88—74)

This invention relates to a diagnostic apparatus for determining the anteriority and posteriority of a patient's head and has for the primary object, the provision of a device of this character which will permit a doctor or operator to determine the posture of a person's head by placing the person or the patient in a sitting position between opposed mirrors of the device having line markings and taking a sight on the device to bring the line markings parallel to each other may then readily determine in which position the patient normally holds the head and having this knowledge he may determine the mal-position of the atlas vertebra in its relation to the occiput or cranium and the exact amount of mal-position by referring to a scale provided for the purpose. Further the device has the advantage of permitting a doctor or operator to determine the exact amount of change after the vertebra has been adjusted towards normalcy by a treatment or adjustment and thereby judge the amount of further correction needed to bring about normal posture of the head and further it may be determined at such time if the vertebra is maintaining its normal position.

Figure 1 is a side elevation illustrating a bilateralscope constructed in accordance with the present invention.

Figure 2 is a top plan view illustrating the device.

Figure 3 is a vertical sectional view indicating by dot and dash lines the sight taken by the operator.

Figure 4 is a sectional view taken on the line 4—4 of Figure 2.

Figure 5 is a sectional view taken on the line 5—5 of Figure 2.

Figure 6 is a sectional view taken on the line 6—6 of Figure 4.

Figure 7 is a detail sectional view taken on the line 7—7 of Figure 4.

Figure 8 is a perspective view illustrating a modification of the present invention, that is, showing a portable bilateralscope with the latter in a collapsed or folded position.

Figure 9 is a top plan view showing the portable device arranged in an operative position.

Figure 10 is a fragmentary end elevation illustrating a combined stop and latch for limiting the movement of one of the mirror frames into operative position and for retaining said mirror frame in said operative position.

Figure 11 is a fragmentary horizontal sectional view showing the hinge connection between the frame or case section and the other mirror.

Figure 12 is a transverse sectional view showing one of the mirrors and its frame and its hinge connection with the portable case or frame and the slide members carried by said portable case or frame.

Figure 13 is a fragmentary top plan view showing a catch for releasably securing the collapsible unit in a folded position.

Figure 14 is a side elevation, partly in section, illustrating another modified form of this invention.

Figure 15:
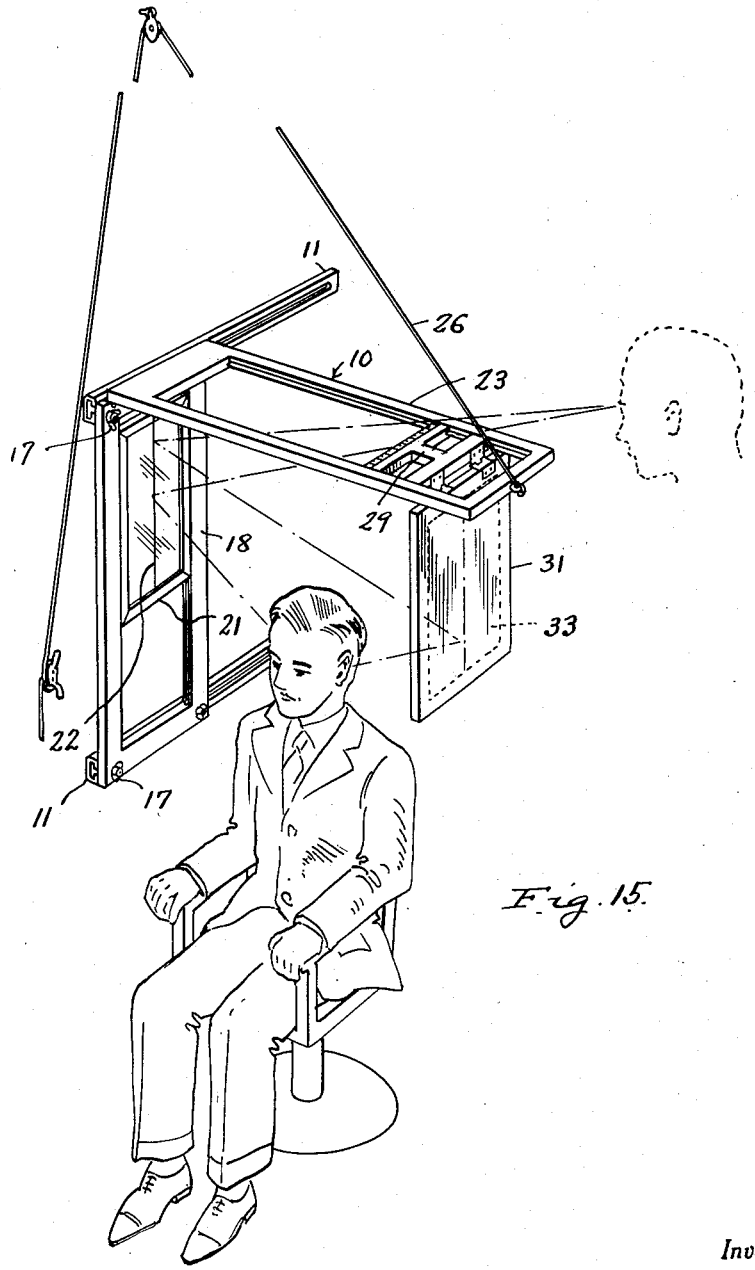
Figure 15 is a perspective view showing the present invention in use.

Referring in detail to the drawings, the numeral 10 indicates in entirety a diagnostic apparatus forming the subject matter of the present invention and to install this invention on a wall of a room, spaced horizontally disposed brackets or members 11 are secured on a wall 12, as shown in Figure 1. The members 11 have slots 13 and the slotted portions of said members are chambered next to the wall, as shown at 14, to receive heads 15 of bolts 16. The bolts 16 extend through the slots and receive thereon wing nuts 17. The bolts 16 also extend through openings provided in a frame 18 forming a part of the diagnostic apparatus 10. The frame 18 is of rectangular shape and may be readily adjusted along the supporting members 11 as will be clearly seen in Figure 4 and after a desired adjustment of the frame has been made it may be secured in its adjusted position by tightening the wing nuts 17 on the bolts 16.

The frame 18 forms a support for a mirror frame 19 and the latter is made for vertical adjustment within the frame 18, the latter being provided with grooves 20 to slidably receive the mirror frame. The mirror frame has a frictional fit with the frame 18 so that it will maintain any of its adjusted positions on the frame 18. A mirror 21 is mounted in the mirror frame 19 and is provided with a vertically arranged line marking or hair-line 22 arranged intermediate of the vertical edges of the mirror.

A supporting frame 23 of rectangular shape has one end secured on the upper end of the supporting frame 18 by hinges 24 which will permit the supporting frame 23 to be positioned parallel with the wall 12 when the device is in non-use or to be lowered into a horizontal position, as shown in full lines in Figure 1, through the use of a supporting cord 26 attached to the free end of the frame 10 and passing over a pulley 27 on the wall and having its free end detachably connected to a cleat 28 on the wall. The frame 23 has grooves to slidably support a sight frame 29 having thereon scale markings 30. The sight frame 29 may be adjusted endwise of the supporting frame 23 and due to its frictional fit with the walls of the grooves of the frame 23 it will retain any of its adjusted positions until manually moved.

A mirror frame 31 of rectangular shape has one end secured on the sight frame 29 by hinges 32. The mirror frame 31 depends from the supporting frame 23 and may parallel the frame 18 or be arranged at an inclination thereto, the hinges 32 being of the frictional type so that the frame 31 will retain any of its angular adjusted positions. The frame 31 has mounted therein a mirror 33 provided with a vertically arranged line marking or hairline 34 arranged intermediate of the vertical edges of the mirror 33. When the device is in operation, as shown in full lines in Figure 1 and also clearly shown in Figure 3, the mirrors 21 and 33 are arranged in opposed relation. Through the adjustment of the sight frame 29 the mirror 33 may be adjusted towards and from the mirror 21 and also the mirror 33 may be adjusted angularly to the mirror 21 by swinging the mirror frame 31 on the hinges 32 and raising and lowering the frame 29 by swinging on the hinges 24.

Figure 15 shows clearly how the present invention is used. The patient is seated in a chair, care being taken to see that the front of the chair is at right angles to the frame 18 of the device. The patient is instructed to look straight ahead in a relaxed position. The device is then adjusted to bring the mirrors 21 and 33 into position at opposite sides of the head and face of the patient. The operator or doctor now looks through the scale frame 29 over the scale markings and sees in the mirror 21 both sides of the face and head of the patient with one image of the patient positioned above the other image of said patient in the mirror 21. This is accomplished by the arrangement of the mirrors 21 and 33 with respect to each other and the patient's head. The mirror 33 reflects the side of the head and face of the patient next to the doctor or operator in the mirror 21, while the other side of the head and face of said patient appears thereunder in the mirror 21. The frame 18 is then adjusted longitudinally so that the hairline marking appearing in the mirror 21 bisects the ear of one of the images and by noting the relative position of the ear of the other image with respect to said hairline marking appearing in the mirror 21, the operator may easily determine by referring to the scale the amount the patient carries the head to the right or left, or in other words, the operator is able to see the rotation of the patient's head by noticing which side of the head is anterior and which side is posterior. The greatest part of the ear will show at the back of the hairline marking on the side of posteriority. The doctor or operator having knowledge of the foregoing described facts about the position of the patient's head is then placed in a better position of knowning how to treat the mal-posture of the atlas vertebra in relation to the occiput or cranium of the patient.

Further, through the use of this device as specified, the doctor or operator may gain knowledge of the benefit derived by the patient from each treatment.

After use of the device, the frame 23 may be swung to parallel the wall 12 of the room through the manipulation of the flexible element 26 and the frame 31 may be swung into parallelism with the frame 23, as shown in dotted lines in Figure 1, so that the device will be entirely out of the way.

Through the adjustment of the frame 18 on the supporting members 11 permits the device to be easily adjusted with respect to a person's head when in a sitting position between the mirrors.

Referring to my modified form of invention as shown in Figures 8 to 13, inclusive, the device may be made up as a portable unit indicated in entirety by the character 35 whereby the device may be conveniently carried from one place to another and is especially adapted for use on patients that are confined in bed. The unit 35 is equipped with suitable carrying handles 36 and consists of a rigid panel 37 having at one end thereof a rightangularly disposed extension 38 on which is hinged a mirror frame 39. The mirror frame 39 supports a mirror 40 constructed similarly to the mirror 21. The upper edge and intermediate the vertical edges is provided with a sight 41 aligning with the line marking or hairline on the mirror 40.

Dove-tailed in the rigid member or panel 37 are slidable members 42 having hinged thereto a mirror frame 43 carrying a mirror 44 corresponding to the mirror 33 and the frame 43 has a sight 45 aligning with the marking on the mirror 44. The sights may be hingedly mounted, if desired, so that they can be folded down on their respective frames when the device is in a folded position. The members 42 being slidably mounted in the panel 37 permit the mirror 44 to be adjusted towards and from the mirror 40 when the device is set up for use, as shown in Figure 9. Instead of employing several of the members 42, a single member may have a dove-tail fit with the rigid panel 37 and the frame 43 hinged thereto. An L-shaped bracket 46 is carried by one of the members 42 and one portion thereof acts as a stop for the frame 43 to prevent said frame from being moved beyond a right angle position to the members 42 or out of parallelism with the frame 39 when the device is set up for use. A slidable catch 47 is carried by the frame 43 and may be moved over the bracket 46 for locking the frame 43 in an operative position.

In the use of this modified form of my invention when the device is set up as shown in Figure 9, the patient is arranged in a sitting position on the bed and the frame 39 is arranged to parallel the wall at one side of the person which positions the frame 43 at the opposite side of the patient. The reckoning made with the modified form of the invention is in accordance with that described with the preferred form of the invention and a detail description is not thought necessary. After the use of the modified form of the invention, the catch 47 is disconnected from the bracket 46 and the frame 43 is swung in parallelism with the panel 37. Due to the extension 38, the frame 39 may be swung to overlie the frame 43 when in its folded position. The frame 39 carries a spring catch 48 which may engage with the bracket 46 to retain the frames in their folded positions against the rigid panel 37. Thus it will be seen that the device is then arranged in a very compact unit which can be conveniently carried from one place to another by the handles 36.

Referring to my modified form of the invention as shown in Figure 14 frames 50 and 51 are employed being connected to each other by hinges 52. The frames 50 and 51 are constructed in accordance with the frames 18 and 23. The frame 51 is provided with a sight frame 29. The frame 50 may be mounted on a wall in accordance with the mounting of the frame 18 and has slidably mounted therein a mirror frame 53 carrying a mirror 54. The marking on the mirror 54 is formed by cutting away the mirror material so that a light may be arranged behind the mirror 54. The sight frame carried by the frame 51 has hinged thereto a frame 56 constructed in accordance with the frame 31 and supports a transparent panel 57.

While I heretofore described the frame 53 as being mounted in accordance with the frame 18 on a wall, this frame may be rigidly mounted in any well known manner. The transparent panel 57 will be provided with a line marking and in use this panel will be next to the operator, so that the operator can look directly through the panel 57 for aligning the marking thereon with the marking on the mirror 54 being aided by an artificial light behind the mirror to bring about quick aligning of the line markings with the person arranged between the mirror 54 and the panel 57. The operator with this type of the invention looking directly through the panel 57 observes one side of the head directly and sees the opposite side of the head in the mirror, 54.

It is believed that the foregoing description, when taken in connection with the drawings will fully set forth the construction and advantages of this invention to those skilled in the art to which such a device relates, so that further detailed description will not be required.

Having thus described the invention, what I claim is:

1. In a device of the class described, first and second mirrors adapted to be arranged at opposite sides of a person's head and face and in opposed relation whereby a second person viewing the first mirror from a position above the second mirror may see in the first mirror both sides of the person's face and head one above the other, said mirrors having hairline markings thereon in the same vertical plane, which plane is perpendicular to the plane of the first mirror and extending from opposite edges of the mirrors across the reflecting faces of said mirrors, means for supporting the first mirror vertically for longitudinal and vertical adjustments, and pivoting means at right angles to the vertical plane for supporting the second mirror by said first means.

2. In a device of the class described, first and second mirrors adapted to be arranged with the reflecting faces thereof at opposite sides of a person's head and face and in opposed relation whereby a second person viewing the first mirror from a position above the second mirror may see in the first mirror both sides of the person's face and head one above the other, said mirrors having hairline markings in the same vertical plane and extending across the reflecting faces thereof from opposite edges of said mirrors, a vertical frame having the first mirror mounted therein for vertical adjustment relative thereto, means for mounting said frame vertically for longitudinal adjustment, and pivoting means at right angles to the vertical plane and connecting the second mirror to the frame whereby the second mirror may be adjusted towards and from the first mirror and tilted relative to the first mirror.

3. In a device of the class described, first and second mirrors adapted to be arranged with the reflecting faces thereof at opposite sides of a persons's head and face and in opposed relation whereby a second person viewing the first mirror from a position above the second mirror may see in the first mirror both sides of the person's face and head one above the other, said mirrors having hairline markings in the same vertical plane extending across the reflecting faces thereof from opposite edges of said mirrors, a vertical frame having the first mirror mounted therein for vertical adjustment relative thereto, means for mounting said frame vertically for longitudinal adjustment, a supporting frame secured on the first frame, supporting means connected to the supporting frame, a sight frame slidably mounted on the supporting frame, and hinges whose axis is at right angles to the vertical plane and connecting the second mirror to the sight frame whereby the second mirror may be adjusted towards and from the first mirror and tilted relative thereto.

DONALD B. MEARS.